United States Patent [19]

Eckels

[11] Patent Number: 4,531,619

[45] Date of Patent: Jul. 30, 1985

[54] COLLAPSIBLE STEERING COLUMN

[76] Inventor: Robert E. Eckels, 49 S. Lookout Mountain Rd., Golden, Colo. 80401

[21] Appl. No.: 423,220

[22] Filed: Sep. 24, 1982

[51] Int. Cl.³ .............................................. B60T 11/00
[52] U.S. Cl. ..................................... 188/371; 74/492; 280/777; 285/227
[58] Field of Search ............... 188/371, 377, 297, 298; 267/9 B, 139, 141.6; 74/492–496, 18.2; 293/133; 92/34, 35, 37, 44; 248/54 B; 285/300, 226, 227, 228; 280/777, 784

[56] References Cited

U.S. PATENT DOCUMENTS

| | | | |
|---|---|---|---|
| 2,014,355 | 9/1935 | Hussman | 285/227 X |
| 3,401,576 | 9/1968 | Eckels | 188/371 X |
| 3,677,106 | 7/1972 | Weston | 74/492 |
| 3,747,367 | 7/1973 | Muller | 285/226 X |
| 3,888,502 | 6/1975 | Felzer et al. | 293/133 X |
| 3,981,114 | 9/1976 | Chupick | 188/371 X |

FOREIGN PATENT DOCUMENTS 1166750  10/1969  United Kingdom ................. 74/492

Primary Examiner—Duane A. Reger
Assistant Examiner—Michael P. Gilday
Attorney, Agent, or Firm—James E. Pittenger

[57] ABSTRACT

A bellows-type energy absorbing device comprising at least two elongated bellows sections each having an adjacent tubular support section assembly wherein one bellows and tubular support section is sized to fit within the other. The sections are reversed and arranged so that the bellows and tube sections are arranged coaxially aligned with each other. The tubular support section of one bellows provides an alignment support for the adjacent bellows with the other support section providing the alignment support for the other adjacent bellows section. The bellows and tube assemblies are joined together at their ends by welding to form a sealed tubular unit. The support sections are arranged to telescope and retain the overall axial alignment of the device during collapse of the convolutes of the bellows section during the application of impact energy at either end of the device. This impact energy causes the convolutes to deform causing a progressive sequential deformation of the bellows sections producing the energy absorbing process. Another embodiment of the invention provides each of the support tubes with a longitudinal taper whereby the contact with the bellows during the energy absorbing deformation is progressively restricted depending upon their overall taper and position to vary the rate of energy absorption.

11 Claims, 9 Drawing Figures

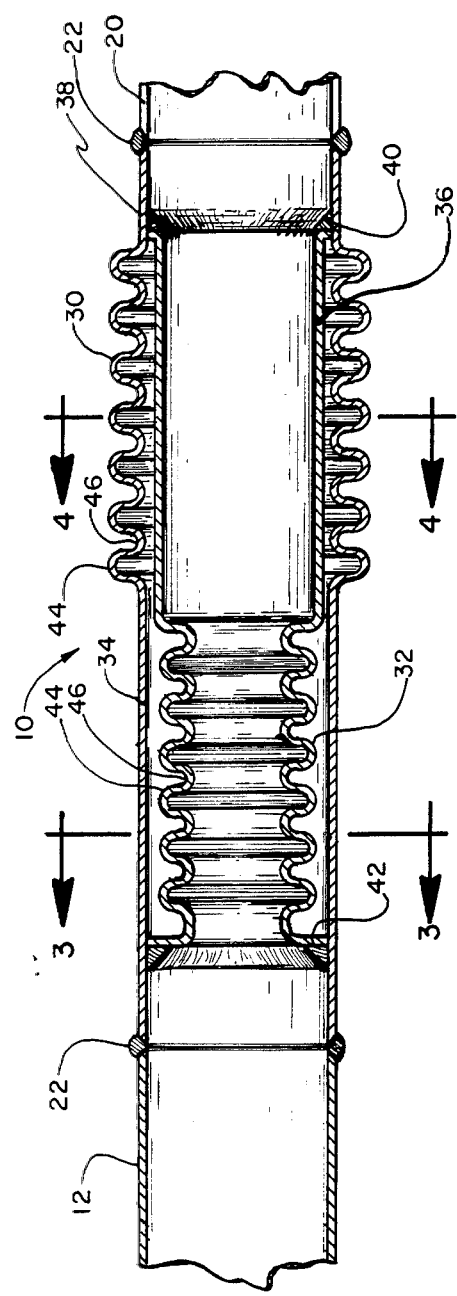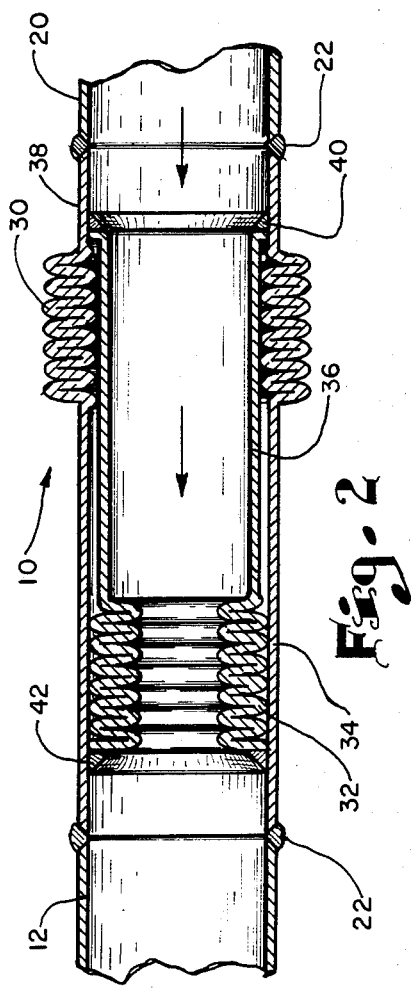

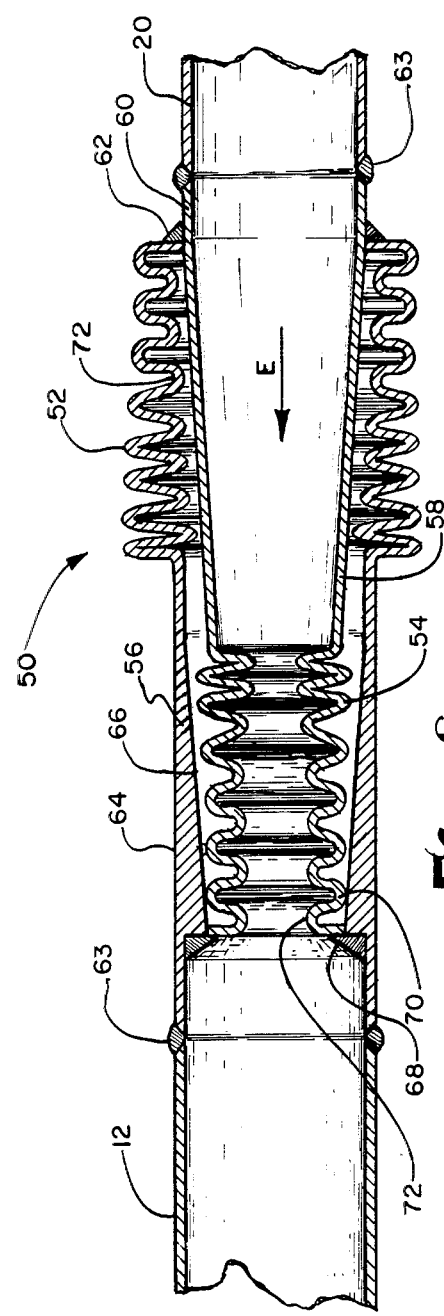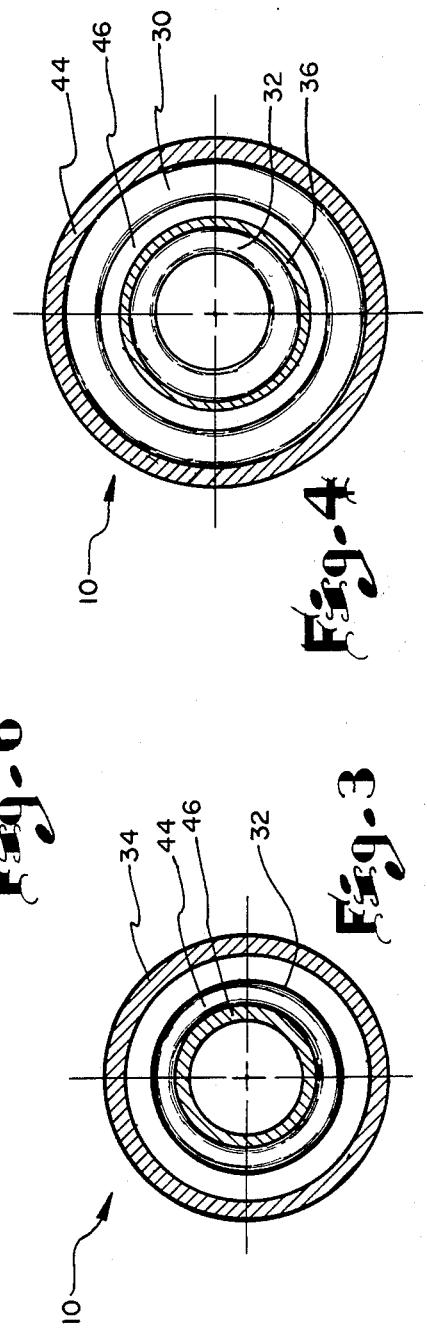

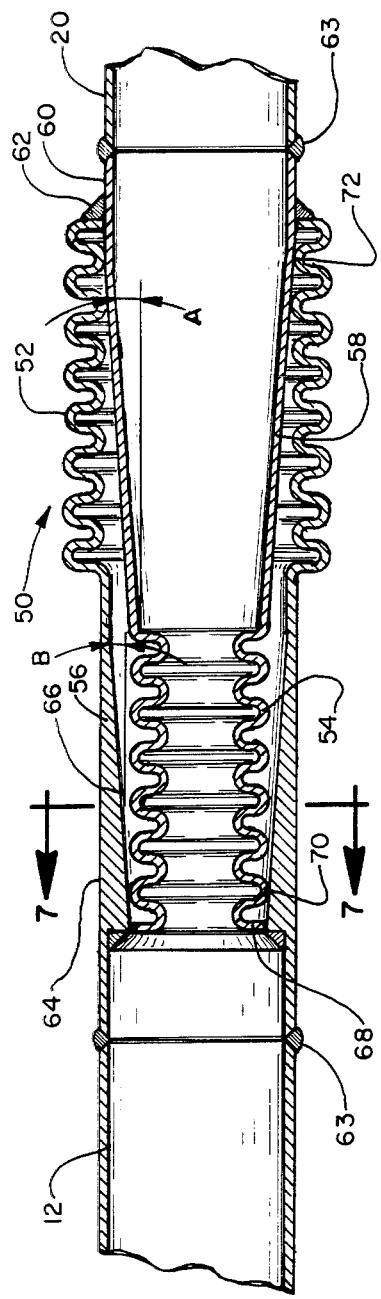
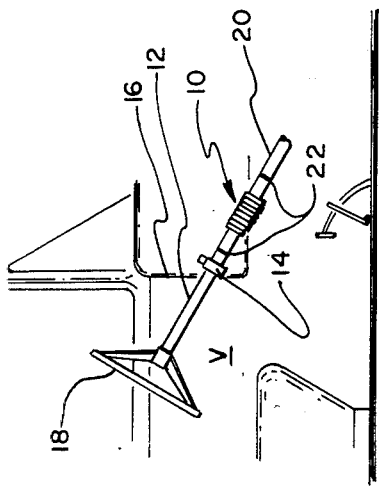
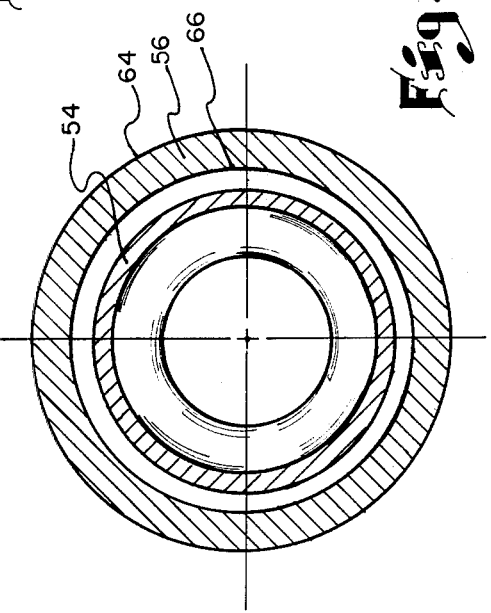
Fig. 5
Fig. 7
Fig. 8

COLLAPSIBLE STEERING COLUMN

FIELD OF THE INVENTION

This invention is directed to energy absorbing safety devices and more particularly is directed to an energy absorbing device which can be used to reduce the hazard of steering columns used on motor vehicles and the like.

BACKGROUND OF THE INVENTION

In my previous U.S. Pat. No. 3,401,576 which issued on Sept. 17, 1968, I disclosed a new and novel impact absorbing collapsible steering column for vehicles which utilized a pair of rod portions connected for conjoint rotation and sliding on each other for shortening and retaining the steering connection during a collision. An energy absorbing collapsible bellows device having metallic convolutes is attached to the two rod portions so as to cover the connection and is arranged to absorb impact energy applied to either end of the steering column by sequential collapse of the convolutes of the bellows.

The steering column according to the prior invention has been well received and accepted by the automobile industry. There have been other attempts in the past to provide other types of steering column assemblies which also can collapse if the vehicle in which the assembly is mounted is involved in a crash or collision. All of these are intended to minimize the risk of injury to the driver of the vehicle who in his vulnerable position is subject to intense injury and trauma by being impaled on the steering wheel shaft. To eliminate or mitigate this situation, it has been found necessary to allow the steering wheel column to move forwardly to cushion the forces created by the impact of the driver's chest and body against the steering wheel and column. By the same token, it is important that any impact with the front portion of the car, as during a collision, be isolated and prevented from being transmitted upwardly toward the driver. To accomplish all of this, it has been found necessary to provide some type of slip joint or impact absorbing device whereby the forces and energy which are applied to either end of the steering column will be successfully contained and restrained.

PRIOR ART STATEMENT

The following is in compliance with the applicant's duty to disclose all pertinent information of which he is aware. These patents are in addition to the applicant's patent which has been mentioned previously herein.

The Ristau patent (U.S. Pat. No. 3,476,345) shows a mounting arrangement for a collapsible steering column for vehicles. In this design the upper support column bracket includes a member having its mounting flanges disposed at an angle. Mounting capsules are releasably interengaged on the bracket member so that upon attachment of the capsules to the vehicle body panel, the bracket will release from the capsules under bending moments of predetermined force which may be applied to the steering column during a collision.

The patent which issued to Ward (U.S. Pat. No. 3,475,984) discloses a vehicle steering column assembly which has an inner and outer column telescopically arranged with respect to each other. The outer column is disposed within a sleeve having a number of convolutes. One end of the sleeve is fixed to the vehicle while the other end is arranged so that downward movement of the outer column will result in extension of the sleeve so that the convolutes will stretch or expand.

The patent which issued to Tenniswood (U.S. Pat. No. 3,472,093) discloses a collapsible steering column shaft for a vehicle. This arrangement has a two-piece steering shaft wherein the intermediate ends of the pieces are provided with hook-shaped end portions that overlap and interlock to form a torque transmitting coupling. Any actual force which is applied to either end of the steering column will cause the coupling to be displaced allowing the end portions to disengage preventing the transmission of force and also eliminating any further steering control.

SUMMARY OF THE INVENTION

This invention is directed to an energy absorbing device for safety-type collapsible steering columns or the like. Several embodiments of the present invention are described with all providing unique features and the basic unique results which are described herein. One of the primary purposes of a collapsible steering column according the present invention is to provide and retain steering control over the vehicle not only in the normal or original condition but after collapse from a collision impact. Thus, the present invention not only prevents the driver's body from being impaled on the steering column at the time of a severe vehicular accident but also allows him to maintain some degree of control of the vehicle during and after this event.

A collapsible steering column including the energy absorbing device according to the present invention includes an outer portion having a bellows section and a straight cylindrical support tube section. A second, interior bellows and support tube section is reversed and is arranged or positioned adjacent the outer bellows and tube assembly and is sized to telescopically fit inside the outer assembly.

As is well known the collapsing of the bellows sections follows essentially a sequential progressive convolute deformation. This deformation provides the energy absorbing characteristic for the device and the steering column.

The design of the bellows sections is arranged so that the inside diameter of the outer bellows in its original condition is slightly larger than the outer diameter of the inner support sleeve. In the same arrangement, the outer diameter of the interior bellows is slightly smaller than the inner diameter of the outer support sleeve. During collapse from the impact energy, the individual convolutes expand outwardly and inwardly with respect to the overall original dimensions of the bellows. The diameter change in the bellows causes at least partial contact with the adjacent support tube sections maintaining the axial alignment of the bellows sections and the overall device. In this way, the entire steering column remains in proper axial position without buckling which would prevent steering control of the vehicle during a collision which in turn would also negate the progressive energy absorption which is so desirable to help prevent serious injury to the driver.

Another embodiment of the present invention provides the same type of controlled convolute collapse as previously described with the added feature that the energy absorption rate varies during the overall functioning of the device. This progressive collapse is accomplished by the use of tapered support tube sections or sleeves for the bellows sections.

As stated previously, the collapse of the convoluted bellows sections is a progressive sequential process. Thus, the collapse usually starts at the end to which the moving force is applied or in an unrestricted area. The bellows sections in their undisturbed condition have a constant inner and outer convolute diameter for their entire length. As the force is applied to the bellows section, the first convolute in the section starts to collapse with the outer dimension of the convolute expanding and the inner dimension contracting toward the center.

The tapered tubular support section, however, has a diameter which closely approximates the diameter at one end of the associated convolute section. The support surface is arranged so that it progressively angles away from the associated convolute section. The collapse of the convolutes in each section usually starts at an unrestricted end and progresses toward the opposite end. Thus, the collapse progression in each bellows moves toward the taper restricted end which places more and more restraint on the expansion of the bellows. In this way, an increasing absorption rate for absorbing the impact forces is provided whereby a nominal amount of force is absorbed in the first inward movement of the bellows with this absorbing characteristic increasing progressively. In this way, an increasing absorption rate is provided to cushion and slow the final axial movement of the bellows during impact.

It is to be understood that this invention can be used in any application where it is desired to provide for the absorption of an impact energy when applied in an axial direction to an elongated member. Thus, where a vehicle is required to have an impact-absorbing bumper, it is possible that the collapsing convolute sections can be used in the bumper supports to absorb any sudden impact. In addition, the energy absorbing arrangement provided in the present invention can be used in any other machinery or equipment where energy absorption is a consideration.

Other features and advantages of the present invention will become apparent from the following detailed description of the invention when it is considered in conjunction with the accompanying drawings.

BRIEF DESCRIPTION OF THE DRAWINGS

FIG. 1 is a side cross-sectional view through the bellows sections of the collapsible safety device according to the present invention;

FIG. 2 is a side cross-sectional view of the bellows sections in the collapsed condition;

FIG. 3 is a cross-sectional view taken along lines 3—3 of FIG. 1;

FIG. 4 is a cross-sectional view taken along lines 4—4 of FIG. 1;

FIG. 5 is a side cross-sectional view of the tapered support sections embodiment of the present invention;

FIG. 6 is a cross-sectional view showing the tapered embodiment in a collapsing condition;

FIG. 7 is a cross-sectional view taken along lines 7—7 of FIG. 5;

FIG. 8 is a pictorial view showing a collapsible steering column using the safety device according to the present invention installed in a vehicle.

DETAILED DESCRIPTION OF THE INVENTION

Figure 9:
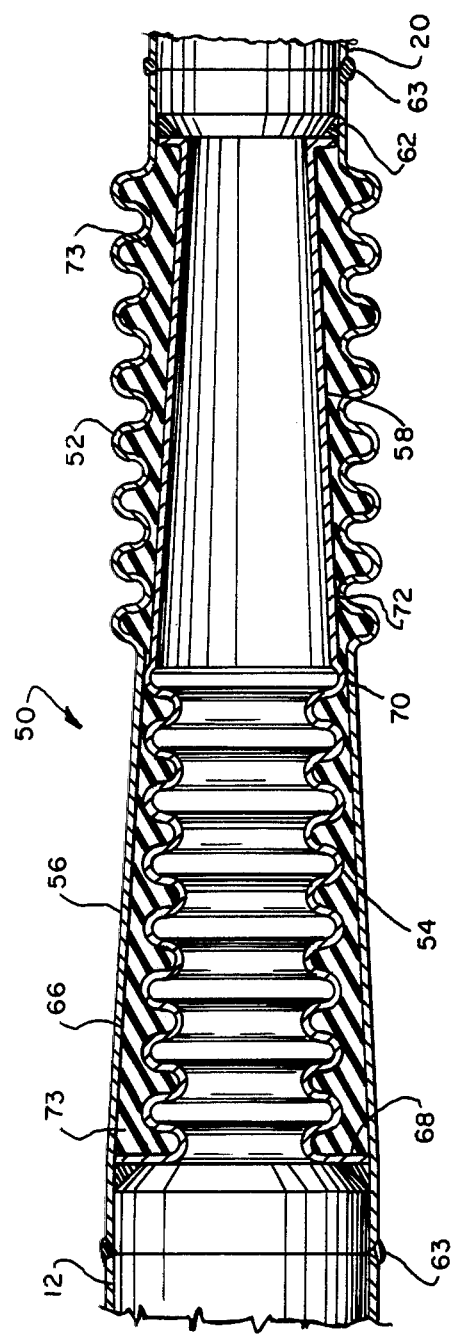
FIG. 9 is a side cross-sectional view of another embodiment of the tapered support sections showing the cavity between sections filled with an elastomeric material.

Turning now more specifically to the drawings, FIG. 8 illustrates an overall side pictorial view of the driver portion of a vehicle showing the steering column 12 having the safety device or impact absorbing section 10 according to the present invention. The steering column 12 is mounted by a suitable bracket 14 to the under portion of the vehicle instrument panel 16. It is to be understood that while illustration is made in this application showing the steering column in relation to a vehicle, usually a passenger vehicle. It is the intent that this invention shall not be limited to use with strictly steering columns but any device which is required to absorb and dissipate energy.

The purpose of the energy absorbing steering column 12 as illustrated herein is to cushion the driver during an impacting collision whereby if his body is propelled forward against the steering wheel, it will allow the steering column 12 to move axially forward into the energy absorbing section 10. By the same token, energy transmitted upwardly through the lower drive section 20 of the steering column will also transfer the impact energy into the absorbing device 10.

The energy absorbing device 10 is usually mounted in the mid-portion of the column between the upper tubular steering column 12 and the lower drive tube 20 by means of any suitable permanent joining method such as by circumferential butt welds 22. The steering column 12 and drive tube 20 can be of any configuration such as the hollow tubes which are shown and illustrated in the attached drawings or any other type of torque transmitting or controlling member such as a solid rod or shaft of any cross-sectional configuration. If there is any major difference in the diameters of the energy absorbing device 10 and the column members to which it is connected, a transition piece can be provided at one or both ends to connect the members together into a structurally rigid control column.

The impact energy absorbing device 10 according to the present invention is both uniquely simple and easy to construct. It is essentially comprised of two bellows sections 30, 32 which are arranged in telescoping slidable position. Cylindrical tubular support sections 34, 36 are provided in conjunction with associated bellows sections 30, 32, respectively. The aligned support section 34 and bellows section 30, form a first energy absorbing assembly which can be formed from the same continuous piece of material or they can be formed separately and joined together by a circumferential weld. The opposite end of the bellows section 30 from the tube 34 can include an extension tube 38 which is provided as a connnecting piece for attachment to the control tube 20. The other end of the tubular section 34 is connected directly to the steering column 12. The second energy absorbing assembly 32, 36 can be formed in the same way and is mounted within the outer assembly 30, 34. The free end 40 of the tubular support section 36 is attached to the inside surface of the extension 38 by any suitable means such as a continuous circumferential weld. The free end of the convolute section 32 ends in an outwardly flared section 42 having a diameter which fits within the inner diameter of the support tube 34. The flared end 42 is permanently joined around its circumference to the inner surface of the tube 34.

It is important to note that the length of the tubular support sections 34, 36 are designed to extend axially beyond the ends of the convolutes of the bellows sections 30, 32. In addition, the support sections 34, 36 overlap in the mid-portion of the device to provide a telescoping effect which will retain the alignment of the tubular members. It should be kept in mind that while the illustration shown herein depicts the tubular support sections 34, 36 as being circular, they can have any usually symmetrical cross-sectional configuration which will allow the telescoping feature and still provide the support for the bellows sections 30, 32.

Each of the bellows sections 30, 32 has a number of individual continuous convolutes which are formed by a back and forth folding process from usually one or several sheets of material. Each of the individual convolutes which make up the entire bellows section has an undulating curved cross-section which is composed of peaks 44 and valleys 46. Each of the peaks 44 and valley 46 areas are formed around the entire circumference of the convolute to form a series of alternating corrugations along the entire surface of the bellows section. Although a specific type of bellows is described herein it is to be understood that any type of corrugated section may be used in this invention with similar, novel results.

Upon application of an axial impact load against the end of either column 12 or drive tube 20 the convolutes are caused to deform axially usually starting from one end or an unrestricted area causing a progressive collapse of each of the bellows sections simultaneously. As this collapse progresses, the sides of the convolutes are mashed together causing the original diameter of the valley portions 46 and peak portions 44 to expand inwardly and outwardly, respectively.

The outside diameter of the tubular support sections 36 with respect to the bellows section 30 is arranged so that the diameter will be slightly greater than the compressed or deformed inner diameter of the valleys 46 so that the tube will contact the valleys 46 and provide support to maintain the bellows section 30 in axial alignment during the progressive deformation of the convolutes. This progressive deformation causing the bellows material in the peaks and valleys to exceed their elastic limit absorbs the impact energy which is applied to the columns. In addition, there is a concurrent frictional effect caused by the convolute surfaces as they come in contact with the aligning members which also absorbs some of the impact energy.

In order to provide different energy absorbing characteristics it is possible that the bellows section can be fabricated from different materials or different thicknesses of materials and possibly of different diameter sizes to vary the energy impact absorbing characteristics of the overall device.

The total energy absorbing capacity for the device 10 is determined by the energy required to collapse and compress all of the convolutes of the bellows sections as shown in FIG. 2. As an extra margin of safety, it is expected that the design of the energy absorbing device can be such that a partial collapse of the bellows section can take place for the greatest impact energy application that is reasonably anticipated.

FIG. 5 shows another embodiment of the impact absorbing device 50 according to the present invention. In this embodiment, dual bellows section 52, 54 having associated tubular support sections 56, 58, respectively, are arranged in telescoping fashion as previously described. The inner support tube 58 includes an extension section 60 which has the same diameter as the drive tube 20 and forms the transition piece between the drive tube 20 and the energy absorbing device 50. The previous embodiment provided the extension section as a continuation of the outer bellows, while in this embodiment, the outer bellows is welded at its free end 62 to the outer circumferential surface of the inner support section 58 and extension section 60. Either arrangement can be used with either embodiment. The internal support tube 58 tapers inwardly at a constant shallow angle A with the interior tapered surface of the second support section 56 having an angle B.

The outer support section or tube 56 has a generally straight outer surface 64 with a tapering inner surface 66. The angle B of the tapering inner surface 66 is usually equal to the angle A of the inner support tube 58. It is to be understood, however, that there could be a difference between these two angles if it is necessary to vary the energy absorbing characteristics of the separate bellows sections within the device. The free end 68 of the bellows section 54 is attached as by welding to the interior surface of the tapered surface 66. As can be readily seen, the peak or outermost area 70 of the first convolute of the bellows section 54 is actually touching or is very close to the tapered surface 66. The peak of the next convolute is slightly further away from the tapered surface with the next even further removed. At the opposite end of the device, the innermost portion or valley 72 of the outer bellows section 52 is arranged to contact or be slightly spaced from the outer surface of the tapered support tube or section 58. The valley of the next convolute being further removed from the support surface.

For a demonstration of actual use, it will be assumed that as seen in FIG. 6, the impact energy is applied in the direction of the arrow E through the drive tube 20. Usually the collapse of the bellows convolutes starts at an unrestricted area or end such as the right portion of the outer bellows 52. This collapse proceeds to the right causing the peaks to expand outwardly while simultaneously the valleys 72 contract inwardly. As previously explained, this deformation of the covolutes absorbs the impact energy transmitted to the bellows section. As this process progresses toward the right the valleys 72 begin to contact the tapered surface of the support tube 58 restricting the complete collapse of that portion of the convolute with a slightly greater energy absorption due to the added restriction. The next convolute is even further restricted. Thus, the energy absorption factor increases as the deformation approaches the right end of the bellows section 52.

As can be readily seen, the inner bellows section 54 follows a similar collapsing pattern during the energy absorbing process in that the first convolutes along the right end as seen in FIG. 6 usually collapse first since they are unrestricted with progression toward the left. The greatest collapse restriction is provided in the end convolute which has its peak 70 in contact with or close to the outer surface of the support tube 66.

Thus, the rate of energy absorption can be greatly modified depending upon the collapse rate built into the bellows sections as well as the angle and diameters provided in the support tube surfaces. By carefully controlling the configuration of the bellows and support tubes practically any type of energy absorbing characteristic such as a continuously linear absorption rate, or a low beginning absorption rate and increasing to high or vice versa is possible.

As can be easily seen in the drawings, since the inner and outer energy absorbing assemblies can be joined and sealed at each end, a space or enclosed cavity can be formed between the assemblies. This cavity can be filled with an elastomeric, resilient material which can support the bellows sections during collapse. The presence of this material can greatly change the energy absorbing characteristics of the bellows and be designed for special applications.

As previously explained, it is important to realize that the energy absorbing arrangement as provided in the present invention can be applied to any use where it is necessary to absorb energy usually in an emergency situation. The tubular support members and bellows sections can be fabricated from any suitable material such as stainless steel, copper, aluminum, paper or plastic materials such as reinforced epoxy resins, polyvinylchloride, polyurethane or the like.

It can also be readily understood that since the energy absorbing device which is disclosed herein can provide an overall closed and sealed tubular system. This arrangement can be utilized in pipelines or conduits with a minimum restriction in fluid flow where only expansive energy instead of impact energy needs to be absorbed and the axial alignment must be maintained.

While an improved energy absorbing device has been shown and described in detail in this application, it is to be understood that this invention is not to be considered to be limited to the exact form disclosed and changes in the detail and construction of the invention may be made without departing from the spirit thereof.

What is claimed is:

1. An energy-absorbing device for mounting in an elongated member for absorbing the forces applied to either end of the member, the device comprising:
   (a) a first energy-absorbing means having a first bellow section and a first elongated tubular support section axially aligned and connected thereto;
   (b) a second energy absorbing means having a second bellow section and a second elongated tubular support section axially aligned and connected thereto, said second absorbing means being sized to fit within said first absorbing means;
   (c) both of said energy absorbing means being connected to each other at their corresponding ends and arranged with the first support section adjacent to the second bellows section and said second support section adjacent to said first bellows section whereby as the first and second bellows section collapses due to the absorption of the energy they will at least partially contact the adjacent tubular support section; and
   (d) at least one of the tubular support sections has a longitudinal taper, the diameter at one end of said tapered section being the same as the diameter of the corresponding surface of the bellows section wherein the collapsing of the bellows section during the application of energy will cause a progressive contacting between the bellows section and the tapered support section causing a continuously changing energy absorption rate for the progressive collapse of the bellows section.

2. An energy absorbing device as defined in claim 1 wherein both of said tubular support sections have a longitudinal tapering configuration.

3. An energy absorbing device for mounting in a vehicular steering column for absorbing impact energy which may be applied at either end of said steering column to prevent injury to the driver of a vehicle in which the steering column is mounted, the device comprising;
   (a) a first energy absorbing means having a first bellows section and a first elongated tubular support section axially aligned and connected thereto:
   (b) a second energy absorbing means having a second bellows section and a second elongated tubular support section axially aligned and connected thereto, said second absorbing means being sized to fit within said first absorbing means; and
   (c) said first and second energy absorbing means are reversed with respect to each other so that the bellows section of one energy absorbing means is coaxially positioned and adjacent to the tubular support section of the other and vice versa, the corresponding ends of said first and second absorbing means being joined together, said tubular support sections are arranged to have a slight longitudinal taper wherein a diameter of each of the support sections is sized to contact at least one convolute of the corresponding bellows sections so that when the device is mounted in the steering column of the vehicle, any impact energy applied to either end of said column will cause the convolutes of both bellows sections to progressively collapse whereby as the bellows sections collapse they will sequentially contact the corresponding tubular support sections to control the rate of collapse and maintain the axial alignment of the steering column during the energy-absorbing function.

4. An energy absorbing device as defined in claim 3 wherein the ends of said tubular support sections having the larger diameter are arranged toward the same end of said energy absorbing device.

5. An energy absorbing device as defined in claim 3 wherein the ends of said tubular support section having the larger diameter are arranged at opposite ends of said device.

6. An energy absorbing device as defined in claim 3 wherein the corresponding ends of each of said absorbing means are joined together by circumferentially continuous joints whereby a closed cavity is formed between said first and second absorbing means.

7. An energy absorbing device as defined in claim 6 wherein the cavity formed between said first and second absorbing means is filled with a resilient material which will support the convolutes of said bellows and control the progressive collapse of the convolutes during the absorption of the impact energy.

8. An energy absorbing device as defined in claim 3 wherein the length of each of the elongated tubular support sections is greater than its corresponding bellows sections so that the tubular sections will telescope with respect to each other so as to provide additional axial alignment support upon the application of the impact energy.

9. An energy absorbing device for mounting in a vehicular steering column for absorbing impact energy which may be applied in either end of said steering column to prevent injury to the driver of a vehicle in which the steering column is mounted, the device comprising:

(a) a first energy absorbing means having a first bellows section and a first elongated tubular support section axially aligned and connected thereto;

(b) a second energy absorbing means having a second bellow section and a second elongated tubular support section axially aligned and connected thereto, said second absorbing means being sized to fit within said first absorbing means;

(c) said first and second energy absorbing means are reversed with respect to each other so that the bellows section of one energy absorbing means is coaxially positioned and adjacent to the tubular support section of the other and vice versa, the corresponding ends of said first and second energy absorbing means being joined together around their entire circumference; and (d) said tubular support sections are arranged to have a slight longitudinal taper wherein an end diameter of each of the support sections is sized to contact at least one convolute of its corresponding bellows section so that when the device is mounted in the steering column any impact energy applied to either end of said column will cause the convolutes of both bellows sections to progressively collapse whereby as the bellows sections collapse they will contact the corresponding tubular support sections to control the rate of collapse and maintain the axial alignment of the steering column during the energy absorbing function.

10. An energy absorbing device as defined in claim 9 wherein the ends of said tubular support sections having the larger diameter are arranged toward the same end of said energy-absorbing device.

11. An energy absorbing device as defined in claim 9 wherein the ends of said tubular support sections having the larger diameter are arranged toward opposite ends of said device.

* * * * *